(12) United States Patent
Roberts et al.

(10) Patent No.: US 6,203,432 B1
(45) Date of Patent: Mar. 20, 2001

(54) SYSTEM FOR ADJUSTING THE RESPONSE CHARACTERISTIC OF AN ELECTRONIC GAME INPUT DEVICE

(75) Inventors: Thomas John Roberts, Alpine; Douglas Frank Shepherd, El Cajon, both of CA (US)

(73) Assignee: Madcatz, Inc., Santee, CA (US)

( * ) Notice: Subject to any disclaimer, the term of this patent is extended or adjusted under 35 U.S.C. 154(b) by 0 days.

(21) Appl. No.: 09/309,333

(22) Filed: May 11, 1999

(51) Int. Cl.[7] ................................... A63F 13/02
(52) U.S. Cl. .................. 463/37; 463/36; 273/148 B
(58) Field of Search ..................... 463/36, 37, 38; 273/148 B (56) References Cited

U.S. PATENT DOCUMENTS

| | | | |
|---|---|---|---|
| 5,630,756 | * 5/1997 | Thurston et al. | 463/38 |
| 5,796,354 | * 8/1998 | Cartabiano et al. | 341/22 |
| 5,847,694 | 12/1998 | Redford et al. | |
| 6,071,194 | * 6/2000 | Sanderson et al. | 463/37 |

FOREIGN PATENT DOCUMENTS

| | | |
|---|---|---|
| 96113582 | 3/1997 | (EP) . |
| PCT/JP95/00950 | 5/1996 | (WO) . |
| PCT/JP96/01237 | 7/1997 | (WO) . |

OTHER PUBLICATIONS

Manual Copy for the V3 Racing Wheel (N64). V3 racing wheel for n64 [online]. Nintendo, 1998 [retrieved on Jan. 24, 2000]. Retrieved from the Internet: <URL: www. interact-acc.com/manuals/sw380.html>.*

V3 Racing Wheel. GameSages—The Cure for the Common Code [online]. [retrieved on Jan. 24, 2000]. Retrieved from the Internet: <URL:sages.ign.com/reviews/hardware/v3racingwheel.html>.*

Tschiltsch, Jeff. 'Re: V3 Racing Wheel 64'. GameWeek [online]. Apr. 1, 1998. [retrieved on Jan. 24, 2000]. Retrieved from the Internet: <URL:gameweek.com/reviews/april/v3.html>.*

Mahood, Andy. Naki Universal Steering Wheel. Gamecenter [online]. Oct. 2, 1998. [retrieved on Jan. 24, 2000]. Retrieved from the Internet: <URL:gamecenter.com/Consoles/Hardware/Sony/Uniwheel/index.html>.*

* cited by examiner

*Primary Examiner*—Valencia Martin-Wallace
*Assistant Examiner*—Julie Kasick
(74) *Attorney, Agent, or Firm*—Luce, Forward, Hamilton & Scripps LLP (57) ABSTRACT

An input device for a computer game has an adjustable response characteristic so that its end-of-range positions can be configured by the player. The response characteristic can be adjusted by selecting one of several sensitivity options, or by moving the device to a position that the player wishes to be a predetermined position. If the input device is a steering wheel, then the selected sensitivity adjusts the positions of the wheel where maximum left and right turn signals are generated. Adjusting the sensitivity lets the player choose whatever positions of the input device he or she finds comfortable for a particular game. The input device can also be configured to have a dead zone at and around its neutral position.

3 Claims, 5 Drawing Sheets

SYSTEM FOR ADJUSTING THE RESPONSE CHARACTERISTIC OF AN ELECTRONIC GAME INPUT DEVICE

FIELD OF THE INVENTION

The present invention is directed to a method and apparatus for adjusting the response characteristic, such as the sensitivity and deadband, of an input device for an electronic game or game accessory, and in particular for configuring the steering sensitivity and deadband of a steering wheel input device.

BACKGROUND OF THE INVENTION

Electronic games are often accessorized with input devices, such as a steering wheel or joystick, which a player uses to control actions in the game. For games which simulate movement, such as driving or flying, the position of the joystick or steering wheel determines the direction of movement of the player or his or her game piece. By changing the direction of movement the player hopes to maneuver successfully through the game.

For any given input device the sensitivity is always the same. Every time that a player uses a particular joystick to play the game, moving it to a certain position (or rotating a particular steering wheel by a certain amount) results in the same change in direction of the player's game piece.

A need exists for an input device whose sensitivity can be adjusted so that different players who prefer different sensitivities can maximize their enjoyment and success in the game. A need also exists for an input device which has a configurable deadband.

BRIEF SUMMARY OF THE INVENTION

It is an object of the present invention to provide an input device for an electronic game which has a settable or adjustable sensitivity and/or deadband.

Another object of the present invention is to provide an electronic game input device which is itself used to set or adjust its sensitivity and/or deadband.

It is yet a further object of the present invention to provide inventive methods for setting or adjusting the sensitivity and/or deadband of an input device for an electronic game.

These and other objects are achieved by providing an electronic game, comprising an input device for use by a player to input commands to the game, said input device being movable within a range of positions; and a controller operatively connected to said input device for generating at least one control signal based upon a current position of said input device, said control signal having a value, wherein the value of said control signal is configurable by the player.

These and other objects are also achieved by providing a method of adjusting the sensitivity of an input device for an electronic game, the input device being movable within a range of positions, said method comprising selecting one of a plurality of sensitivities for the input device; recording the selected sensitivity; and generating a control signal representing a current position of the input device, the value of the control signal being based on the selected sensitivity.

Still further, these and other objects are achieved by providing a remote accessory for use with an electronic game, comprising a steering wheel input device movable within a range of positions; a controller operatively connected to said steering wheel for generating at least one control signal based upon a current position of said steering wheel, and for transmitting said control signal to the electronic game, wherein a value of the at least one control signal generated by said controller is adjustable by the player.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings.

DETAILED DESCRIPTION OF THE PREFERRED EMBODIMENTS

The following description of the preferred embodiments refers to an accessory for a computer game, but it should be understood that the accessory can be any remote input apparatus connected through wired or wireless connection (s) to an electronic device, such as a computer game, or the accessory can be a self-contained electronic device or game. The computer games contemplated by the present invention include games played on personal computers, electronic games played on televisions or other displays through dedicated game systems such as the NINTENDO64 game system or the SONY PLAYSTATION game system (note: the words NINTENDO64, SONY and/or PLAYSTATION may be subject to trademark protection, as well as stand alone self-contained games. Furthermore, the terms "adjustable" and "configurable" as used herein are intended also to encompass embodiments which offer only a one-time irreversible setting of the input device's sensitivity. Although the terms "sensitivity" and "deadband" are sometimes used separately, it is intended for the term "sensitivity" as used herein to be interpreted broadly and to encompass adjustments to the deadband, as explained in more detail below.

Figure 1:
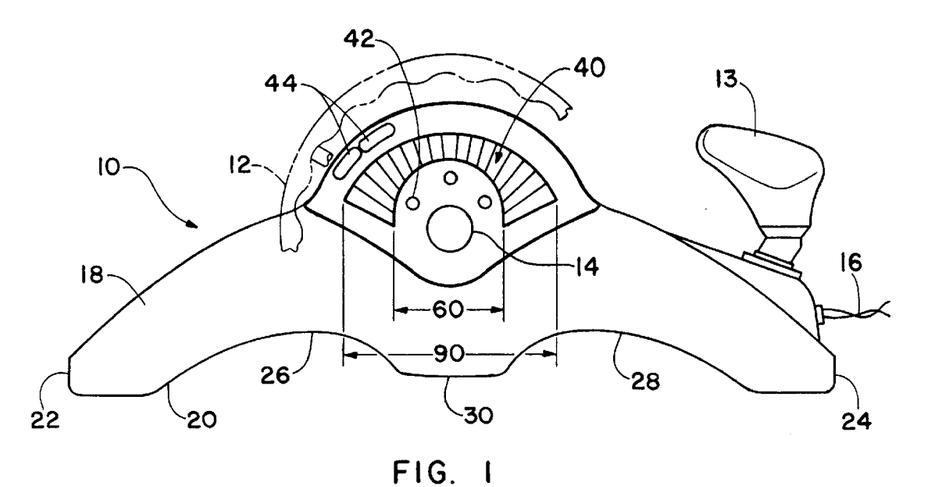
FIG. 1 shows a front view of a computer game input device according to a preferred embodiment of the present invention.

FIG. 1 shows a computer game accessory according to a preferred embodiment of the present invention. In this embodiment, the accessory is an input apparatus having, as input devices, a gear shifter 13 and a steering wheel 12. The steering wheel is connected to a rotatable shaft 14, although the connection is omitted for clarity. The accessory 10 is used by the player to input signals in order to play the computer game. A wired or wireless communication line 16 transmits signals and/or power to and/or from the accessory 10 to a remote unit (not shown) which can be a personal computer, a dedicated game device, or any other remote terminal used to receive and/or transmit signals to/from the accessory 10. Power to the electronic components can also be supplied by a battery or a standard power cord connected to a wall outlet.

The communication line 16 is known in the art and need not be further elaborated herein, except to note that it is an optional feature and can be omitted if the accessory 10 is a self-contained device or game. Moreover, when the accessory 10 is a remote accessory for use with a device such as the NINTENDO64 game system or the SONY PLAYSTATION game system or a personal computer, the communication line 16 must carry signals that conform to the format that the device is configured to accept.

The steering wheel 12 is rotatable in clockwise and counterclockwise directions within a range of positions to designate different directions that the player wishes his or her game piece to move. At a given position of the wheel, the accessory 10 generates a control signal representative of a direction that the position corresponds to. The steering wheel can have physical stops that prevent it from rotating beyond certain left (counterclockwise) and right (clockwise) positions, or it can be designed to have infinite rotation if that is desired, but typically only a range of its positions will produce different control signals representative of a change in direction. For example, a "maximum left turn" may be reached by rotating the wheel 12 to the left, and any further rotation of the wheel to the left will continue to produce the same "maximum left turn" control signal. For positions between the "maximum left turn" position and the steering wheel's neutral position, appropriate control signals are generated corresponding to the direction that the position represents. The artisan will recognize that the input devices contemplated by the present invention are not limited to those which indicate direction or change of direction to the game, but rather to any input device which has variable positions and is to deliver different control signals to a controller depending on the position to which it is moved.

The steering wheel 12 or other input device typically will have a neutral position where the direction of the player or his or her game piece is "straight," although the neutral position can mean different things depending on the game or program. Springs or other mechanisms (not shown) can tend the input device toward its neutral position.

One of the aspects of the present invention is to allow the player to configure where he or she wants the steering wheel's "maximum left turn" and "maximum right turn" positions to be. When the player configures these end positions to be close together, then the steering wheel is more sensitive because small movements in the wheel result in greater changes to the control signal. Similarly, if the player configures the end positions to be farther apart, then the steering wheel becomes less sensitive because more movement of the wheel is required in order to bring about the same change in the control signal. In other words, for a given position of the steering wheel or other input device, a different control signal is generated depending on where the "maximum" or "end-of-range" positions are. This is explained in further detail with respect to FIGS. 4(*a*) to 4(*f*).

The illustrated embodiment of the present invention allows the player to use the accessory comfortably from a sitting position. The accessory 10 is preferably light enough to rest comfortably on the player's lap, and has an outer body 18 made of plastic or other rigid material housing the accessory's internal electronic circuitry. The body 18 is preferably formed from at least two pieces which are attached during the accessory's latter stages of manufacture.

The body 18 includes an underside surface 20 having a width spanning between left and right edges 22 and 24, as viewed from the player's perspective. The left and right edges 22, 24 are spaced so as to span a person's lap. For adults, the width may be on the order of 45 cm (18 inches) or more in order to accommodate a lazy sitting position in which the knees are far apart, although the present invention is not limited to any particular width. For accessories designed specifically for children, the width is preferably smaller. In the preferred embodiment, the accessory 10 is on the order of 22 cm deep and 17.5 cm high, disregarding the steering wheel, but the invention is not limited to any particular dimension.

The underside surface 20 preferably includes at least one concavity designed to fit over the lap of the player while he or she is sitting. Two concavities 26, 28 are shown in FIG. 1, wherein a ridge 30 is formed at the intersection of the two concavities 26, 28 and lies, in use, between the thighs of the player. The present invention can also be adapted to a body 18 having a single concavity for the entire lap, or a flat underside surface with no concavity at all. It is also preferable for the underside surface 20 to have generally horizontal regions adjacent the left and right edges 22, 24 at or beyond the side edges of the player's lap. Those horizontal regions, perhaps with the aid of suction cups (not shown), can be used to secure the accessory 10 to a table top or other smooth surface while the player plays the game, as an alternative to resting it on the player's lap. Rubber or felt pads on the horizontal regions can also be used to provide a stable surface for supporting the accessory 10 on a table top. At the back end of the accessory 10, a third generally horizontal region is also preferably formed (or attached) on the body 18 so that the accessory 10 has three coplanar surfaces to support it when placed on a table top. A rubber or felt pad, or a suction cup can also be used on the third horizontal region.

In FIG. 1, the front face of accessory 10 has output devices such as an LED display 40 and a set of illuminated indicators 42, and a set of input switches 44. The LED display 40 is shown following the arc of the steering wheel shaft 14, indicators 42 are shown between display 40 and shaft 14, and input switches 44 are near the top left edge of the front face. Switches 44 can be push-buttons. The present invention is not limited to any particular arrangement or type of such components, and further can be provided with output sound generators (not shown), but the illustrated positions give them easy access and visibility.

Figures 2, 6A, 6B:
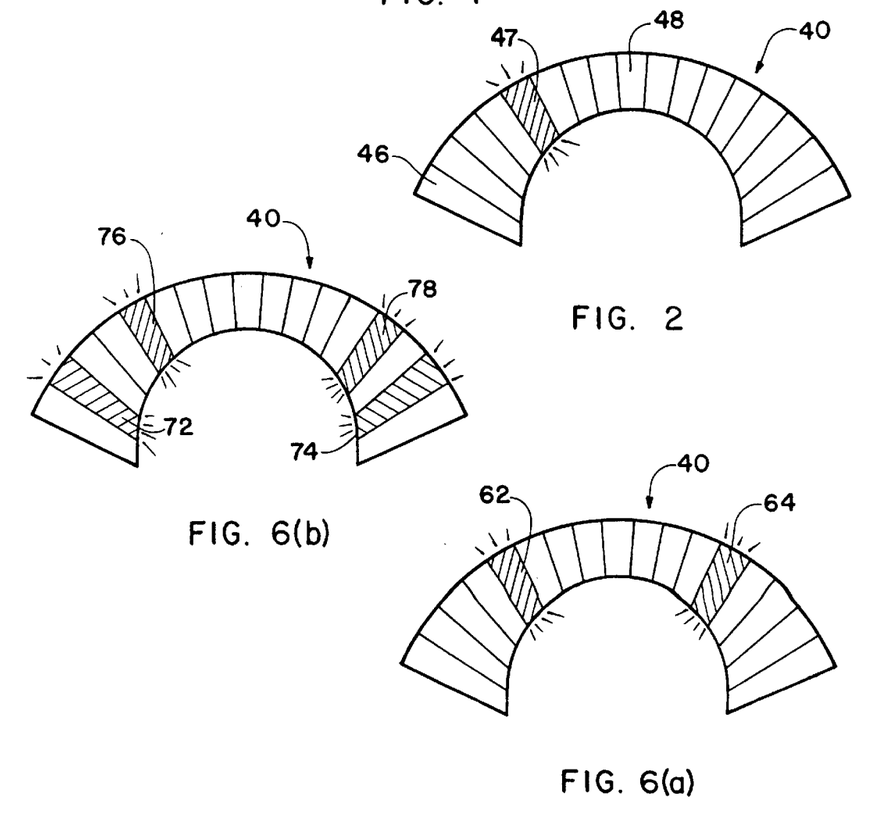
FIG. 2 shows a close up of the display device shown in FIG. 1.
FIGS. 6(a) and 6(b) shows embodiments of a display visible in the present invention.

In operation, the steering wheel 12 or other input device is used as the player plays the game, moving the wheel 12 to appropriate positions in order to proceed successfully through the game. Accessory 10 can include or be connected to a speed input device such as simulated vehicle gas and/or brake pedals so that additional control signals are fed to the game. The display 40 can be used to indicate the speed and/or steering direction of the player's game piece. As shown in FIG. 2, the LED display 40 has a plurality of elements. They can be of the same or different colors, for example green toward the left and red toward the right. As the gas pedal is pressed and the game's vehicle speeds up, the green and then the red LED's can be controlled to progressively light up so that the player knows when the vehicle is reaching an excessive speed. The elements can also be multi-colored LED's so that they illustrate different information in different modes of operation. In order to indicate direction, one element of the display 40 can be illuminated at a time to show the current steering position 47 between the maximum left turn (the left-most LED 46) and the neutral position (the center LED 48) or dead zone.

The present invention finds applicability to accessories having input devices other than a steering wheel 12 or gear shifter 13. Joysticks, for example, provide additional degrees of freedom and therefore are useful to provide directional information in more than the left-right directions of a steering wheel. Therefore, display 40 can be modified to illustrate speed and/or direction for these additional directions as well.

Figure 3:
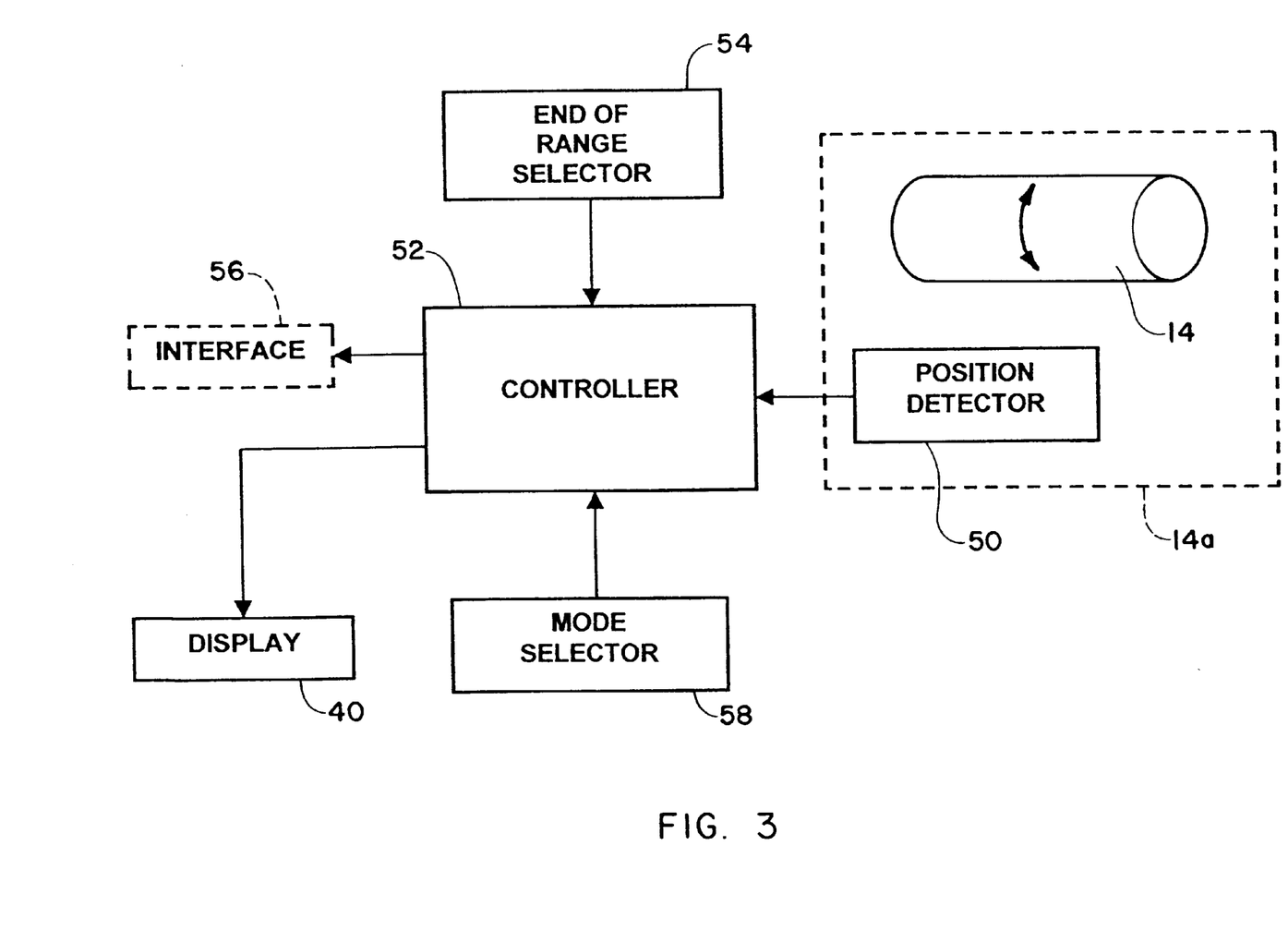
FIG. 3 shows a schematic block diagram of the components used in a preferred embodiment of the present invention.

FIG. 3 illustrates a preferred arrangement of electronic components used in the present invention. The steering wheel shaft 14 is operatively connected to, or integrated with, a position detector 50. When integrated, the shaft 14 and detector 50 can constitute a single input device 14*a*. The position detector 50 is connected to a controller 52, which is preferably but need not be the main controller for the accessory 10. In a preferred implementation, the position detector 50 is an electronic potentiometer connected to the shaft 14, providing digital voltage signals proportional to a rotational position of the shaft 14 between predetermined end limits. The potentiometer provides, for example, a "zero" signal to the controller 52 when the shaft 14 is at its "furthest to the left" physical limit, and a high signal when shaft 14 is at its "furthest to the right" physical limit, and intermediate signals therebetween. It is preferable to use stops (not shown) that give the shaft a total of about 270° of rotation from its furthest left limit to its furthest right limit. The physical limit of movement of the steering wheel 12 or other input device should not be confused with the end-of-range positions configured by the player according to the present invention. The end-of-range position is the position that results in a maximum (or minimum, whatever the case may be) control signal in the game even though the input device can still be moved more, beyond the end-of-range position, until it hits the physical limit of its movement.

Other position detectors 50 can be used with the present invention, such as Hall effect sensors, optical sensors, or any other sensor which provides an indication to the controller 52 of the input device's current position. For joysticks that move in more than just left-right directions, the signal carried by the position detector 50 may contain several individual position signals to cover each degree of freedom. The position signal, however, should be or be converted to a multi-bit digital signal usable by controller 52.

The controller 52 is preferably a microprocessor and operates by translating the position of the input device into a control signal which is used internally and/or transmitted to an interface 56. The control signal is then used by the game in order to adjust its processing according to the user's current direction of movement. If controller 52 is the main game controller, then it uses the control signal to decide how the game proceeds. If accessory 10 is a remote input apparatus for a game played on a personal computer, dedicated game device, or with any other external apparatus, then interface 56 carries the control signal to its destination. The reaction of a game due to the control signal is something that is known in the art and need not be further elaborated herein. Interface 56 may include the communication line 16 (FIG. 1), and is shown in phantom in FIG. 3 because it is optional, especially when the accessory 10 is a self-contained electronic device or game. Controller 52 also controls the operation of display 40 and/or indicators 42 (FIG. 1) as needed.

According to the present invention, controller 52 translates the position signal from position detector 50 into a control signal representative of the current position of the input device in relation to the end-of-range positions selected by the player. In order to configure the value of the control signal or the sensitivity and deadband of the input device, a preferred embodiment of the present invention uses a special configuration mode which the user enters by operation of mode selector 58. See step 60 in FIG. 5. Mode selector 58 can correspond to one of the switches 44 shown in FIG. 1. When the user selects mode selector 58, a change-mode signal is transmitted to the controller 52. Controller 52 may decide whether to acknowledge the change-mode signal. For example, it may have an internal flag set when the game is inactive, be it when the game has not yet started or during a break in the game, and will disregard the change-mode signal unless the flag is set. When not disregarded, controller 52 enters the configuration mode.

Figure 5:
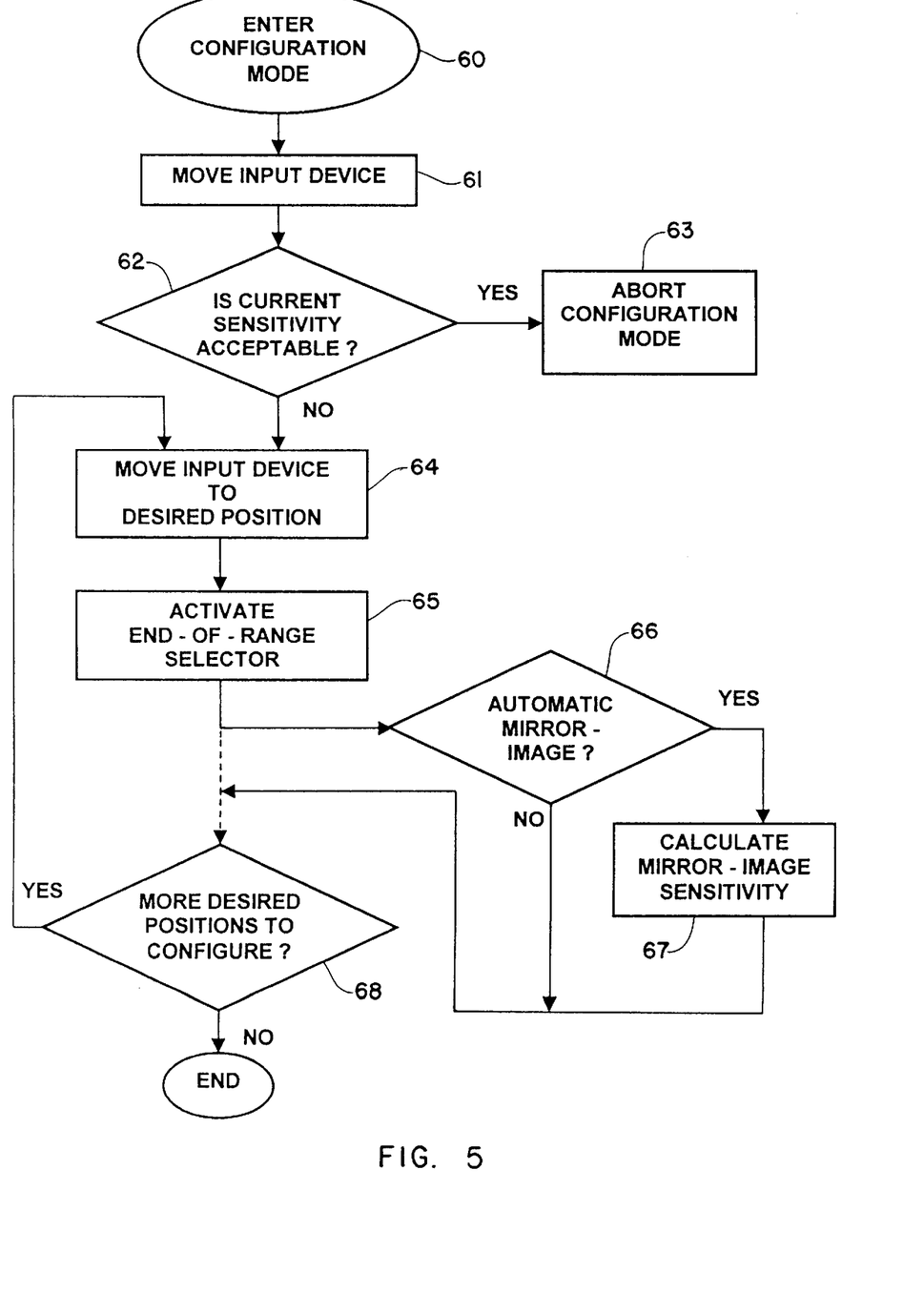
FIG. 5 shows a flowchart illustrating the steps that a player takes to configure the input device according to an embodiment of the present invention.

In the configuration mode, the player moves the input device to a first "end of range" or "E.O.R.−" position. See step 64. As an example for steering wheel 12, this can be a left position where the player wants the "maximum left turn" to be. Once at the desired position, the player engages an end-of-range selector 54, which can also correspond to one of the switches 44. See step 65. The end-of-range selector 54 provides a signal to the controller 52 informing the controller 52 that the current position is desired to be the first end-of-range position.

In a first embodiment of the present invention, when the end-of-range signal is received, the controller 52 records the then-current position of the input device as reflected by the signal from position detector 50. That position is recorded into memory (not shown). If the input device is of the type that supplies a control signal having a symmetrical transfer function on either side of a neutral position, such as left-right or up-down, then the controller can also calculate a mirror-image of the first end-of-range position. The mirror-image position or "E.O.R.+" position is determined relative to the input device's predetermined neutral position, and is also recorded into the memory. This is done by calculating the difference between the position value for the neutral position and the position value for the first end-of-range position, and using that difference to determine a value of equal distance from the neutral position but on the opposite side of the neutral position than the first end-of-range position. See steps 66 and 67. This automatic calculation gives the player the same steering sensitivity on each side of the input device's neutral position.

After the configuration mode and during the game, the controller 52 continually monitors the current position of the input device and, by determining where the current position is relative to the two end-of-range positions recorded in memory, outputs a control signal representative of the correct direction. The controller can use interpolation to determine this relative position. The interpolation need not be a mathematical calculation, but can also be implemented through a look-up table that is generated based upon values of the end-of-range positions.

In a second embodiment of the present invention, and if applicable to the type of input device being configured, after the player has selected the first end-of-range position on one side of the input device, the player moves the input device to a different side relative to the neutral position and again selects the end-of-range selector 54. The controller then records this new position as another end-of-range or "E.O.R.+" position, much like a repeat of steps 64 and 65. See step 68.

Preferably, the controller 52 uses the display 40 to inform the player which range is to be adjusted next. For example, for a steering wheel, the left side of display 40 can flash to indicate that the left end-of-range position is to be selected, and afterward the right side of display 40 can flash to indicate that the right end-of-range position is to be selected. As an alternative, one or more indicators 42 can be used to indicate which position is to be selected next, and whether the adjustment has been registered.

Preferably, as an additional feature to any part of the configuration mode, the player can move the input device to see whether he or she wants to keep the current configuration or change it. As the player moves the steering wheel 12, step 61, but before activation of the end-of-range selector 54, the controller 50 illuminates whichever one of the LED's in display 40 corresponds to the steering wheel's current position within the then-registered sensitivity. For example, LED 47 is illuminated when the wheel is about halfway between the neutral position and the left end-of-range position. This gives the player an idea of the current sensitivity. If the sensitivity is acceptable, then the player can abort the configuration mode. See steps 62 and 63. Aborting the mode can be done in various ways, such as by again selecting the mode selector 58, or by waiting for expiration of a time-out, or designing other suitable abort measures. If the current sensitivity is not acceptable, then the player proceeds with the configuration mode. Upon selection of the end-of-range selector 54, step 65, the current position LED 47 (FIG. 2) can be turned off and the maximum left-most LED 46 illuminated, indicating that a new left end-of-range has been selected. A similar process can be performed when the configuration mode enters the right-side adjustment, or, if the automatic mirror-image is to be selected, then both the left-most and right-most LED's are lit upon selection of the one end-of-range position, indicating that both sides of the new sensitivity range have been registered. For other input devices, a similar process can be used for whatever additional directions of movement they may offer.

As shown in FIG. 4(*a*), during the game the controller 52 produces a control signal representing the input device's current position between neutral ("N") and the player-selected end-of-range positions. At and beyond the end-of-range positions, the maximum control signal designated 100% in FIG. 4(*a*) is generated. The artisan will recognize that the value of the outputted control signal generated in response to the input device's current position need not be linear or analog. Rather, FIGS. 4(*a*) through 4(*f*) are intended to illustrate how, according to the present invention, the end-of-range signals determine the transfer function of the direction control signal produced for the game. For example, the sensitivity of FIG. 4(*b*) requires more left-right movement for the input device in order to achieve the same control signal. In practice, the control signals are likely digital, multi-bit format when used with the NINTENDO64 game system and the SONY PLAYSTATION game system but can be any other suitable format as well.

In another embodiment of the present invention, the player selects a "dead zone" at and around the neutral position of the input device, which gives "play" to the input device. This embodiment can be used with or without any of the end-of-range embodiments. If used with the end-of-range embodiments, then the automatic mirror-image calculation of the second end-of-range position will utilize information about the edges of the dead zone. Therefore, it is preferable, although not necessary, to have the player configure the dead zone before configuring the end-of-range positions.

During configuration of the dead zone, the controller preferably informs the player that the dead zone is what is being configured. This can be done by illuminating appropriate LED's in display 40 or otherwise. As in the end-of-range embodiments, the player moves the input device to the left-most edge of the dead zone and activates the end-of-range selector 54 (or other selector if a separate selector is desired). The controller 52 then records the then-current position of the input device into memory. The dead zone configuration mode can automatically produce a mirror-image dead zone edge for the opposite side of the input device relative to the neutral position, or the player can specify a dead zone edge for the opposite side. In either embodiment, the controller uses the recorded dead zone to determine when to issue a control signal indicative of the neutral position. This allows the player to wobble the input device at and around the neutral position without causing a change in direction of his or her game piece.

As shown in FIG. 4(*c*), during the game the controller 52 produces a control signal corresponding to the position of the input device relative to the closest edge of the dead zone and the end-of-range position. This can be done using the interpolation discussed above. If, during the game, the input device is between the dead zone edges D.Z.− and D.Z.+, then the controller will produce a control signal representative of the input device being in its neutral position.

FIGS. 4(*d*) and 4(*e*) show further embodiments of the present invention. While FIGS. 4(*a*) through 4(*c*) show interpolation between neutral (or dead zone) and end-of-range positions, FIGS. 4(*d*) and 4(*e*) show that the present invention can also allow the player to select intermediate range I.R. positions for the input device. In these embodiments, controller 52 preferably informs the player when the intermediate position is to be selected, and the player proceeds to move the input device to the selected position and then activate the end-of-range selector 54 (or other dedicated selector). For example, the intermediate position can be 80% of the maximum control signal, or 50%, or any other value. The player decides, according to the way he or she is comfortable using the input device, where the input device should be positioned in order to produce the intermediate control signal. The player then activates the end-of-range selector 54 (or other selector if a separate one is desired), and the controller goes about recording the current position of the input device as is done for the end-of-range and dead zone positions.

Figure 4A:
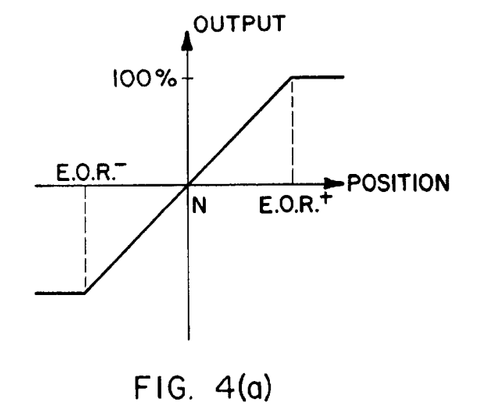
FIGS. 4(a) to 4(f) show various output signal waveforms that can be used with the present invention.
Figure 4B:
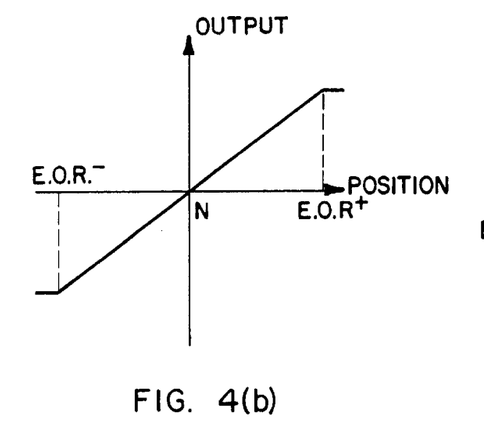
Figure 4C:
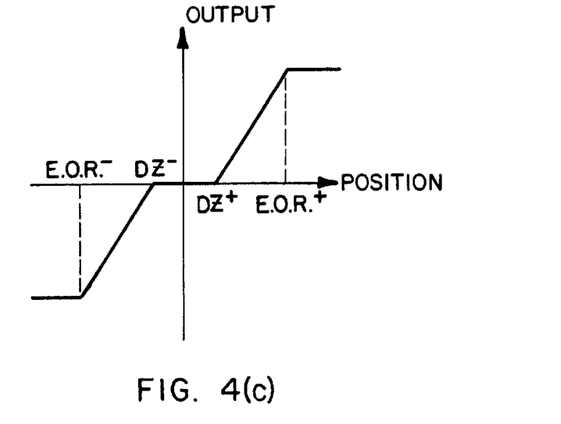
Figure 4D:
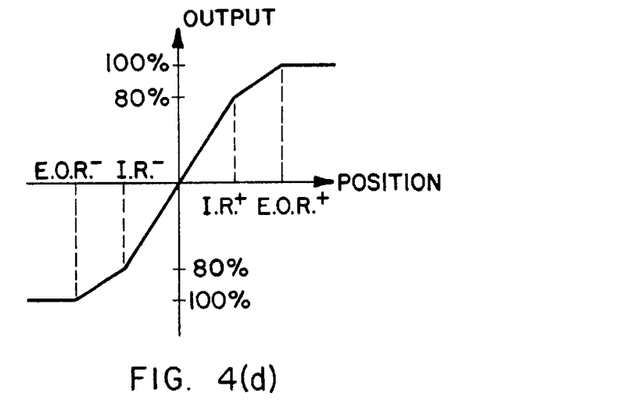
Figure 4E:
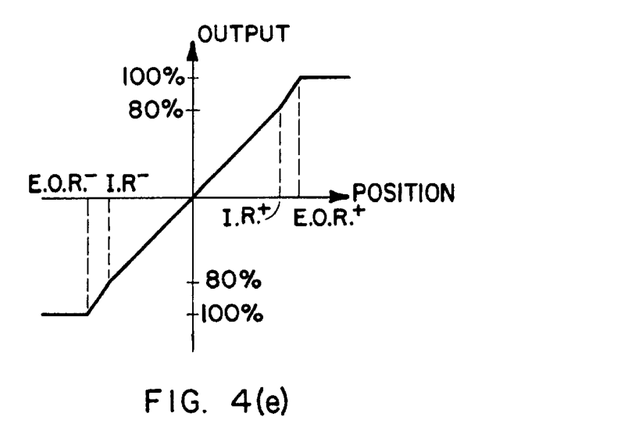

In these latter embodiments, during the game the controller 52 interpolates the input devices current position between the end-of-range, intermediate, and/or dead zone positions to generate the control signal to be used by the game. As with the end-of-range and/or dead zone selection, the controller 52 can automatically determine a mirror-image position for a selected intermediate position.

The intermediate positions offer a non-linear sensitivity between the input device's end-of-range positions, and can be used with or without any of the other embodiments described herein. The embodiment of FIG. 4(d) shows less sensitivity near the outer edges of the range, while FIG. 4(e) shows less sensitivity near the neutral position of the input device. The more intermediate positions that are offered, the more non-linear, and the more complex, the input device's control signals can become.

Figure 4F:
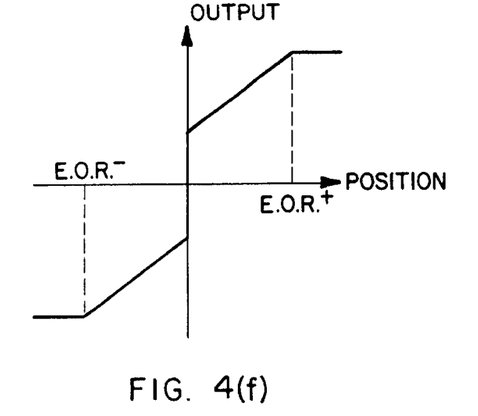

FIG. 4(f) illustrates the fact that the dead zone can also have a negative size. If the edges of the dead zone are configured to lie on the "wrong" side of each other, then the input device will be unable to produce a control signal corresponding to positions at and around the neutral position, even if the device is moved to its neutral position. This can be useful to remove the deadband that may be "hard-wired" into the software of the game being played.

Figure 7A:
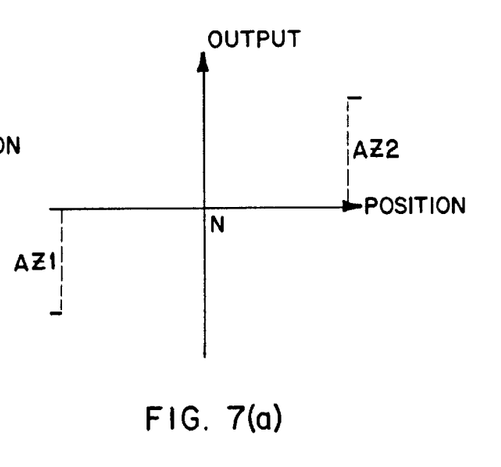
FIGS. 7(a) and 7(b) show transfer functions for a control signal generated in embodiments of the present invention.

In further embodiments of the present invention, the accessory 10 is used to supply discrete or digital commands analogous to a "due left" or "due right" directional button on known controllers. When producing such command signals, the player turns the wheel (or whatever other type of input device) to a selected position where the device produces, for example, a "due left" output command. The transfer function for digital outputs from the input device is shown in FIG. 7(a) and is applicable to any of the embodiments described herein. Selecting a single position gives the input device a dead zone DZ and an active zone outside of the dead zone. If the input device produces opposite signals when moved to opposite sides of the dead zone DZ, such as a steering wheel, then one active zone AZ1 produces a predetermined constant control signal whenever the input device is moved to or beyond a first one of the player-selected sensitivity positions. Moving the device into the other active zone AZ2 produces an opposite control signal whenever the input device is moved to or beyond the opposite one of the player-selected sensitivity positions.

Figure 7B:
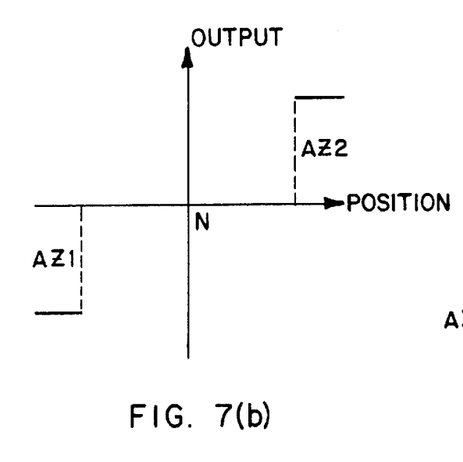

If the player configures the sensitivity positions closer to the neutral position of the input device, then the transfer function shown in FIG. 7(b) would result. The deadzone DZ is smaller, meaning that the player would have to turn the wheel (or other input device) less to the left in order to cause the "due left" command signal to be produced.

Additional embodiments of the present invention include configuring the end-of-range, deadzone, and/or intermediate positions using dedicated switches rather than the joystick, steering wheel, or other input device. These embodiments take advantage of one or more of the input switches 44 on the body 18. The switches can be placed elsewhere, such as on the input device itself.

In these switch-controlled embodiments, steps 64–67 are replaced with the activation of switches by the player, as described below. The calibration mode is entered using one of the switches 44 and, as with the aforementioned embodiments, the mode can be a specific mode for configuring the end-of-range, deadzone, or intermediate positions, or the mode can sequence through all of the various sensitivities so that any or all of them can be modified.

Once the mode is entered, the display 40 is used to inform the player of the device's current sensitivity. FIG. 6(a) shows how a medium sensitivity is displayed through illumination of symmetrical LEDs 62, 64. This medium sensitivity means that the player would have to turn the wheel (or whatever input device is being calibrated) approximately halfway to its left-most limit in order to generate a maximum left turn, or to generate a "due left" command when in a digital output mode such as shown in FIGS. 7(a) and 7(b).

Adjusting the sensitivities is done using another one of the switches 44. An "up" button transmits assigned to controller 52 informing it to increase the spacing of the positions, and controller 52 in turn illuminates a pair of LEDs lying closer to the outer edges of the display 40. A "down" button decreases the positions, and thus causes controller 52 to illuminate a pair of LEDs lying closer to the center of the display 40. The type of switch 44 used to input the player's selection does not matter, but buttons are easy for the player to use. Four switches 44 can be used, for example by having "left" and "right" switches to adjust the deadband, and "up" and "down" switches adjust the end-of-range positions.

The effect of the adjustment is to change the transfer function that controller 52 uses when interpolating the input device's current position relative to the selected end-of-range, etc., positions. There are preferably nine sensitivity levels that can be chosen when in digital-output mode, and five deadband and four end-of-range choices in analog-output mode.

FIG. 6(b) shows how the display 40 can be used to show the end-of-range and deadzone positions. Using multi-color LEDs, the LEDs 72, 74 corresponding to the relative location of the end-of-range positions are illuminated in one color, perhaps green, and another pair of LEDs 76, 78 corresponding to the relative location of the deadzone positions are illuminated in a different color, perhaps red. As the sensitivities are being configured, the controller 52 changes which LEDs are illuminated. In FIG. 6(b), the player has selected a very large deadband, and end-of-range positions close to the full throw of the wheel. Changing the end-of-range and deadzone positions results in transfer functions such as those shown in FIGS. 4(a) through 4(f), with the slope and corners of the transfer function changing accordingly.

The invention having been thus described, it will be obvious that the same may be varied in many ways, not only in construction but also in application. For example, the player can be offered different modes to select, one for the end-of-range position, one for the dead zone configuration, etc., or all such positions can be configurable in a single mode. The mode selector switch(es) can be provided on the steering wheel. The invention can be adapted to a pedal or lever, a dial, or a joystick-type of mouse used on lap top personal computers—to virtually any type of input device. Such variations are not to be regarded as a departure from the spirit and scope of the invention, but rather as modifications intended to be encompassed within the scope of the following claims.

What is claimed is:

1. A positional input device for use by an operator to input data to a computer, the device comprising:

user interface hardware structured to allow manipulation throughout a plurality of input positions by the operator;

input-to-output conversion hardware structured to convert the input position of the user interface hardware into an output signal corresponding to an output position with respect to an output position axis having an extreme negative position, an extreme positive position and a nominal zero position;

deadband controller hardware structured to allow the operator to specify a deadband range of input positions that will be converted by the input-to-output conversion hardware as corresponding to the nominal zero position of the output position axis; and end-of-range controller hardware structured to allow the operator to specify at least one end-of-range position of the user interface hardware that corresponds to at least one of the extreme negative position and the extreme positive position of the output position, with the deadband controller hardware and the end-of-range controller hardware being structured to allow specification of deadband range independently of the at least one end-of-range position.

2. A positional input device for use by an operator to input data to a computer, the device comprising:

user interface hardware structured to allow manipulation throughout a plurality of input positions by the operator;

input-to-output conversion hardware structured to convert the input position of the user interface hardware into an output signal corresponding to an output position with respect to an output position axis having an extreme negative position, an extreme positive position and a nominal zero position; and deadband controller hardware structured to cause the input-to-output conversion hardware to convert input positions to output positions such that there is a dead zone of negative size.

3. The device of claim 2 wherein the deadband controller hardware is structured to allow the operator to specify a deadband range that has a positive size or a negative size.

* * * * *